United States Patent [19]

Gardner et al.

[11] Patent Number: 4,583,512
[45] Date of Patent: Apr. 22, 1986

[54] FUEL FEED AND FUEL VAPORIZATION SYSTEM

[76] Inventors: Paul R. Gardner; Elmer W. Gardner, Jr., both of 3359 Alexis Rd., Cincinnati, Ohio 45239

[21] Appl. No.: 456,527
[22] Filed: Feb. 22, 1983
[51] Int. Cl.$^4$ .......................................... F02M 31/00
[52] U.S. Cl. .................................. 123/557; 123/558
[58] Field of Search ............................... 123/557, 558

[56] References Cited

U.S. PATENT DOCUMENTS

| | | | |
|---|---|---|---|
| 4,106,453 | 8/1978 | Burley | 123/557 |
| 4,106,457 | 8/1978 | Totten | 123/557 |
| 4,454,851 | 6/1984 | Bourbonnaud | 123/557 |

*Primary Examiner*—Ronald H. Lazarus

[57] ABSTRACT

A fuel feed and fuel vaporization system for an internal combustion engine comprising a closed circuit feed line and a separate intake for air and for fuel. Each intake having a preset and predetermined and adjustable flow meter regulator valve connected to a transducer and accelerator lever for controlling the flow of air and fuel according to the size and capacity of the engine. The air and fuel are electrically heated by a series of resistive elements inside separate heat exchange units located inside the intake manifold and casing before mixing in a common heat exchange and being fed though a series of electrically operated valves into the combustion chamber of the engine. No carburetor or fuel injection system is needed. A thermostat or time delay controls the temperature to the heat exchange.

1 Claim, 1 Drawing Figure

FUEL FEED AND FUEL VAPORIZATION SYSTEM

REFERENCES CITED

U.S. PATENT DOCUMENTS

| | | | |
|---|---|---|---|
| 3,630,698 | 12/28/71 | Joseph H. Baldwin | |
| 3,653,643 | 04/04/72 | Oliver M. Tucker | |
| 3,496,919 | 02/24/70 | Forrest E. Gerrard | |
| 3,294,381 | 12/26/66 | Harold Schwartz | |
| 2,982,528 | 05/02/61 | Robert E. Shelton | |
| 2,218,922 | 10/22/40 | Ivor B. Newberry | |
| 2,026,798 | 01/07/36 | Charles E. Pogue | |
| 1,997,497 | | Charles E. Pogue | |
| 2,026,798 | | Charles E. Pogue | |
| 4,106,453 | 08/78 | Ernest G. Burley | 123/557 |
| 4,106,457 | 08/78 | George F. Totten | 123/557 |
| 4,454,851 | 06/84 | Marc Bourbonnaud | 123/557 |

FIELD OF THE INVENTION

This invention relates to fuel feed and fuel vaporization of a combustible fuel, such as gasoline, and its application to the internal combustion engine, particularly to that of non stationary vehicles.

DESCRIPTION OF THE PRIOR ART

The mainstay for controlling the flow of fuel and air and its vaporization as applied to the internal combustion engine has been the carburetor, which is located outside the engine. The disadvantage with this type of fuel feed system is the inherent loss of fuel and vapor to the atmosphere, the fire hazard and also the lack of proper heat to the fuel feed process, expecially during inclement weather.

Engine exhaust and coolant from the cooling system have been bypassed to the carburetor and fuel lines for heating the fuel and with some success; although this method lacks the capacity for preconditioning the fuel for engine startup during cold weather and is inconsistent in application.

SUMMARY OF THE INVENTION

The advantage of this invention is the air and fuel are preheated prior to engine startup, and the fuel to air ratio is formulated mathematically and is a predetermined and a preset measurement according to the piston displacement and its demand for energy.

Fuel is fed through a closed circuit feed line that is separate from the air intake to the engine. Both fuel and air are preheated separately each inside electric heat exchange units located inside the intake manifold or casing, and before mixing and reheating inside a common electric heat exchange and being fed to the combustion chamber of the engine.

An electric valve (common to the industry) for each cylinder, that is set to the timing cycle of the engine for the opening and closing of the intake valves, permit the fuel vapor and air to enter the combustion chamber only during the compression stroke of the piston.

A pressure flow meter valve (common to the industry) is located to the air inlet and a flow meter valve is adapted to the closed circuit feed line for fuel, both being located outside the intake manifold. The valves are preset and adjustable to a predetermined setting as formulated for the size and capacity of the engine.

The flow meter valves (common to the industry) are preferably of the electric solenoid type that would receive current from a battery. The flow meter valve for fuel and the flow meter valve for air are adapted to a transducer comprising a variable sliding potentiometer that supplies current to each valve in proportion to its resistance as preset and predetermined according to the fuel to air ratio formula. The transducer potentiometer is connected to and moved by the accelerator feed lever attached to the accelerator pedal (not shown) that is operated by the operator of the vehicle.

Each heat exchange unit is located downstream from the flow meter valves and consists of tubing of highly conductive metal such as copper or aluminum having a series of equally spaced openings throughout. Each heat exchange contains a series of electric resistive elements that heat the metal and the liquid fuel and the air flowing therein as current is supplied from the battery through a switching relay connected to a thermostat or time delay and also to the ignition system of the vehicle.

OBJECTS OF THE INVENTION ARE:

(1) To provide for a closed circuit fuel feed system for the internal combustion engine (2) To eliminate the present day carbureton system (3) To confine the exposure of a combustible fuel and its vaporization to a restricted area within the internal combustion engine (4) To eliminate fire and explosive hazards (5) To improve engine startup during inclement weather (6) To provide for better fuel vaporization and a fuel to air ratio.

DESCRIPTION OF THE DRAWING

The drawing shows the closed circuit feed line from the fuel tank to the intake manifold with the flow meter valves, and the electric heat exchange units inside the intake manifold.

DETAILED DESCRIPTION OF THE INVENTION

Figure 1:
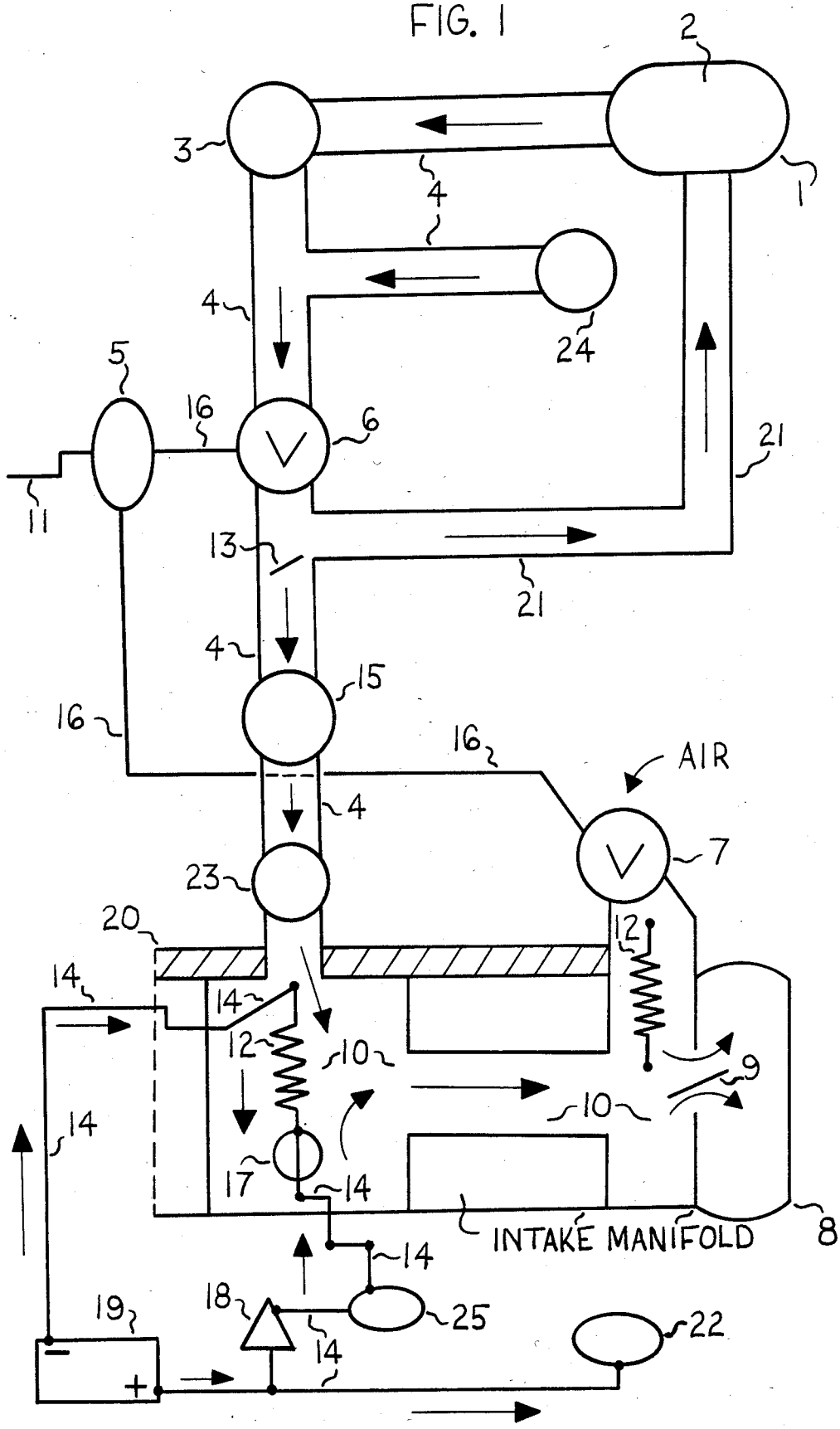

The drawing in FIG. I illustrates liquid fuel 2 in a conventional fuel tank 1 that is pumped by a conventional fuel pump 3, that can be either electrical or mechanical, through a closed circuit fuel feed line 4 to a fuel flow meter 6 (common to the industry). The fuel flow meter 6 serves as a valve for the flow of fuel through the fuel feed line 4 that is connected to the intake manifold of the gasoline engine at its topside to an opening separate from the air inlet opening.

A second flow meter 7 serves as an air inlet and is a pressure valve that opens and closes to the vacumn developed inside the engine and the atmospheric pressure on the outside. Both the fuel flow meter valve 6 and the pressure flow meter valve 7 are electric valves that open and close in degrees according to the applied current supplied by electrical wiring 16 from a potentiometer 5 that is connected to the accelerator feed control lever 11, that is connected to the accelerator pedal of the vehicle. (not shown)

Each flow meter valve is preset according to a predetermined measurement by an adjusting screw, or can be factory preset, according to the piston displacement of the engine. The potentiometer has variable resistance and is the sliding type that moves proportionately to the movement of the accelerator feed control lever 11. The potentiometer 5 serves as a transducer for the feeding of current through electrical wires 16 to the flow meters 6 and 7 and according to the resistance induced by the accelerator feed control lever 11. The resistance is a preset and predetermined factor and is set at the potentiometer to coincide with the current demand of the flow meter valves 6 and 7.

Fuel is fed from the fuel flow meter valve 6 as it is pumped through fuel feed line 4 by a second fuel pump 15 and to an atomizer 23 that is adapted to the fuel feed line 4 and has a number of small orfices throughout. Fuel pump 15 forces an amount of liquid fuel under pressure through the atomizer 23 that is fed downstream through the fuel feed line 4 into an opening inside the intake manifold and directly into a heat exchange unit or fuel cell 10 that comprises a series of resistive wires 12 fixed inside the heat exchange 10 that is preferably tubular in shape but can be of any size or shape. The heat exchange should be made of a highly conductive material, such as copper or aluminum, and should have a plurality of openings throughout its sides and bottom so that the liquid fuel forced over the resistive wires 12 are heated when a positive current is supplied from the battery 19 to one end of the resistive wire 12 and a negative current is supplied from the battery 19 to the other end of resistive wire 12 supplied through wire 14.

The wire 14 to the vehicle ignition switch 22 passes current from the battery 19 through relay 18 through a fuse 25 and through wire 14 to the positive side of the resistive wire 12, and the positive wire is also connected to a thermostat 17 located inside the heat exchange 10 that controls the temperature inside the heat exchange 10 by turning off and on the current to the resistive wire 12. A time delay that is set according to the temperature can also be used. (Wire from thermostat to relay coil not shown)

The ignition 22 can be set to preignition to allow time for the heat resistive wire 12 to heat up before starting an engine. The liquid fuel passing over the hot resistive wire 12 is vaporized and the vapor is passed to a common heat exchange 10 at the intake valves to the engine. The heat exchanges all are interconnected by enclosed tubing that is separated from the casing of the intake manifold and is fixed to it. The vapor from the liquid fuel remains heated by the hot tubing and the heat from the resistive wires as it is drawn to the common mixing chamber 10 by the suction created by the piston movement at the engine cylinders 8. At the same time air is drawn in through pressure meter flow valve 7 directly into tubing connecting said valve comprising the heat exchange 10 and containing a series of resistive wires 12 that are heated in the same manner as for the liquid fuel (wiring not shown).

The openings in the heat exchange are arranged so that the vapor will escape only into heat conductive tubing that is enclosed, or into the common or air heat exchange and not escape from the enclosure. It is a simple arrangement and copper pipe serves very well, by connecting three sections of copper pipe together, one each for the heat exchanges and a connecting section between the two. The air and common heat exchanges are one unit, and the common heat exchange end is arranged to the engine cylinders 8 having openings for the vapor and air to pass through electric solenoid valves 9 that are arranged to the timing cycle of the engine. The valve 9 opens only for one cylinder at a time and for the introduction of hot air and fuel vapor only during the down stroke of the piston for the compression stroke. In this manner the piston pulls in air and vapor only when it is needed for combustion. (Wiring not shown for electric solenoid valves9 but the wiring arrangement is common to the industry).

The preset measurement for fuel flow is obtained by the following calculation, and this measurement is applied to the setting of the potentiometer transducer and also to the flow meters. The mathematical formula is:

When:
N = Number of cylinders of engine
E = Engine Size (cubic inches)
R = Revolutions per minute at given constant speed
S = Constant speed (MPH)
T = Duration of constant speed = (Minutes)
V air = volume air consumed (cubic feet)
W air = weight air consumed (pounds)
Vf = volume of fuel consumed (gallons)
Wf = weight of fuel consumed (pounds)

$$\frac{T \cdot R}{2} \cdot \frac{E}{1728} = V \text{ air}$$

$$W \text{ air} = V \text{ air} \cdot (.0764)$$

Assuming that fuel/gasoline occupies zero volume in the cylinders:

$$\frac{\text{Air}}{\text{Fuel}} \text{ Ratio } \frac{W \text{ Air}}{WF} = \frac{\text{Air}}{\text{Fuel}} \text{ Ratio}$$

$$Wf = Vf \cdot (6.1) =$$

Fuel that is fed to the heat exchange 10 passes through a screen, 20 preferably of copper, that is mounted to the entrance to the heat exchange at the intake manifold opening and helps heat the fuel and also prevents fuel vapor from backing up through the system. A back pressure valve (common to the industry) 13 closes the fuel feed line for the flow of fuel to the heat exchange 10 when pressure from the engine becomes excessive. Excess fuel (liquid) returns to the storage tank 1 through fuel line 21. A second storage tank 24 that serves as a reserve supplies fuel (liquid) through fuel feed line 4 to fuel flow meter valve 6 on demand and is pumped by fuel pump 3. Fuel Flow meter valve 6 accepts only the amount of fuel that is needed, as the potentiometer 5 regulates the current that controls the size of its opening for the flow of fuel.

The invention claimed is:

1. In an internal combustion engine including a fuel feed and vaporization system, said system having a fuel tank containing a liquid fuel supply, a supply and return fuel line connected to said fuel tank, wherein the improvement comprises:
   an apparatus for providing a predetermined and preset quantity of preheated fuel and air to the combustion chamber,
   said supply line extending between the fuel tank and the apparatus,
   and the return line connected at one end to the supply line and at the other end to the fuel tank,
   at least two fuel pumps positioned in said supply line for pumping liquid fuel to said apparatus,
   at least one atomizer positioned in said supply line between the pump and apparatus for atomizing the fuel prior to its admission to the apparatus,
   said atomizer including multiple holes for passing the fuel through in order to atomize the fuel,
   a first predetermined and preset electric flow meter valve positioned in the fuel supply line between the two pumps and upstream of where the return line connects to the supply line to return an unused portion of the fuel from the supply line to the fuel tank, said apparatus including a housing containing at least three electric heat exchangers, an intake opening connected with said fuel supply line, said fuel passing in heat exchange relationship with some of said electric heat exchangers, an air intake opening into said housing, said air passing through a portion of the housing separate from the fuel and in heat exchange relationship with at least one of the electric heat exchangers prior to its mixing with fuel and being fed to an outlet in said housing which connects to the intake manifold of the internal combustion engine, a second predetermined and preset electric flow meter valve in an air intake line leading to the air intake opening, a sliding potentiometer connected to the accelerator fuel lever and receiving input therefrom, said potentiometer providing an output variable electric current to said first and second flow meter valves to proportionately open said valves according to the demand for liquid fuel provided by the input of the movement of the accelerator feed lever, whereby the fuel and air are supplied to the apparatus in such a manner as to provide a predetermined and preset quantity of electrically preheated fuel and air to the engine according to piston displacement and energy requirements.

* * * * *